Oct. 20, 1936.  C. RAMSTEAD  2,057,976

VALVE

Filed Aug. 4, 1933

Charles Ramstead
Inventor

By C.A.Snow&Co.
Attorneys.

Patented Oct. 20, 1936

2,057,976

UNITED STATES PATENT OFFICE 2,057,976

VALVE

Charles Ramstead, Okmulgee, Okla., assignor, by mesne assignments, of one-half to Zacharia Zachari Application August 4, 1933, Serial No. 683,679

1 Claim. (Cl. 277—13)

This invention relates to a combined stop, waste and hot water drain valve, the primary object of the invention being to provide a stop valve which will operate to drain the hot water pipe lines of the system with which the valve is used, simultaneously with the closing of the main or stop valve.

An important object of the invention is to provide a valve body wherein the drain opening thereof, lies in a plane below the pipes of the system being drained thereby insuring against the water collecting in the valve body.

A still further object of the invention is to provide a valve which closes in a direction with the flow of water under pressure, passing through the valve, thereby reducing wear on the valve washer and valve seat to a minimum, and greatly increasing the life of the valve washer.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figures 1, 2:
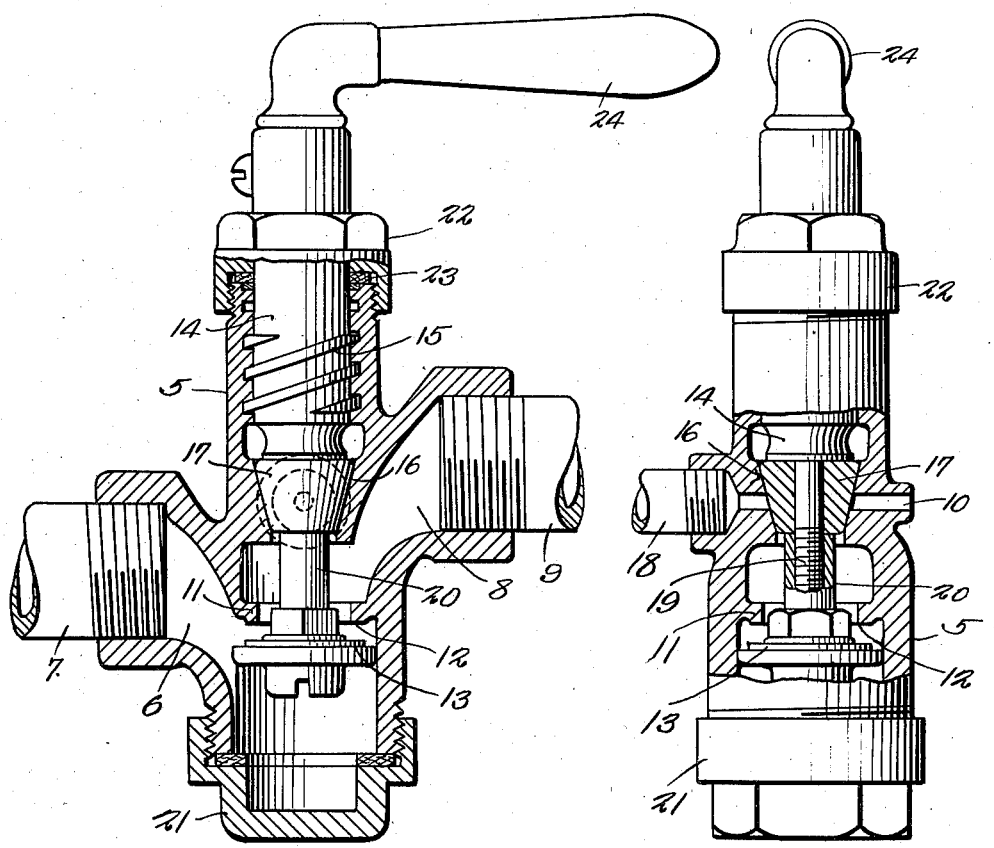
Figure 1 is a vertical sectional view through a valve constructed in accordance with the invention.
Figure 2 is a vertical sectional view through the valve, taken at right angles to Figure 1.

Referring to the drawing in detail, the valve comprises a body portion indicated generally by the reference character 5, the body portion being provided with an inlet opening 6 in which the inlet pipe 7 is positioned, and an outlet opening 8, in which the outlet pipe 9 is positioned.

As clearly shown by Figure 1 of the drawing, the outlet opening 8 is disposed above the inlet opening 6, and above the drain opening 10 of the valve, so that when the main or stop valve has been moved to its closed position, the water from the pipe 9 will gravitate to the drain opening 10.

A partition 11 is arranged within the valve body and divides the valve body into an inlet side and outlet side, the partition providing a valve seat 12 for the stop valve 13, which operates within the inlet side of the body portion, and closes in a direction with the flow of water through the valve body, thereby reducing wear on the valve washer and valve seat, to a minimum.

The reference character 14 designates a valve stem that extends into the body portion through an opening formed in the top of the body portion 5, the body portion being formed with internal threads that cooperate with the threads 15 of the valve stem, so that rotary movement of the valve stem will operate to raise or lower the valve stem, to control the valves supported thereon.

Arranged in spaced relation with the valve seat 12, and disposed directly thereabove, is a tapered valve seat 16, which tapered valve seat accommodates the valve member 17, which is tapered to fit within the tapered seat 16.

The drain opening 10 of the valve body, extends entirely through the valve body, and merges into the valve seat 16, with the result that when the tapered valve member 17 has been properly seated, the drain opening will be closed and the flow of water through the drain opening, will be prevented.

As clearly shown by Figure 2 of the drawing, one end of the drain opening 10 is enlarged and threaded to receive the threaded end of the pipe 18 that communicates with the hot water pipes of the system with which the valve is used.

Thus it will be seen that when the valve 17 has been moved away from its seat, the water in the system with which pipe 9 communicates, will flow through the drain opening 10. The hot water in the system will also be drained through the pipe 18, and drain opening 10, with the result that the hot and cold water of the system will be drained from the system, by a single operation of the valve.

The arrangement of the valves 13 and 16, is such that when the valve 13 is in an open position, allowing the water to pass through the system with which the valve is used, the valve 16 will be closed, but when the valve 13 has been moved to a closed position, the valve 16 will simultaneously move to its open position, permitting the water to drain therefrom.

The valve stem 14 is formed with threads 19 that fit into the tubular valve support 20, securing the valve support 20 and its valve 13, to the valve stem.

The lower end of the valve body portion is closed by means of the cap 21, which when removed, permits of ready access to the valve 13, to facilitate repair.

The upper end of the valve body is closed by means of the nut 22 that supports the gasket 23.

On the upper end of the valve stem, is a control handle 24, through the medium of which the valve stem and its valves may be operated.

Having thus described the invention what is claimed is:

A valve of the class described, comprising a body portion having an inlet opening and an outlet opening disposed above the inlet opening, a passage leading from the inlet opening directing the flow of water downwardly to the bottom of the body portion, a valve seat separating the inlet and outlet openings, a tapered valve seat above the first mentioned valve and below the outlet opening of the body portion and having a lateral drain opening, a hot water drain pipe extending into the body portion and in communication with the interior of the body portion through the tapered valve seat, a valve stem threaded in the body portion and extending through the valve seats into the bottom of the valve body, a disk valve on the lower end of the valve stem and adapted to engage the lower side of the first mentioned valve seat controlling the passage of water through the body portion, a tapered valve on the valve stem and adapted to engage the tapered valve seat, said valves being so arranged that when the disk valve is closed, the tapered valve is open allowing water to drain from the hot water drain pipe and pipe leading from the outlet opening of the body portion.

CHARLES RAMSTEAD.